United States Patent [19]
Donovan et al.

[11] Patent Number: 6,145,295
[45] Date of Patent: Nov. 14, 2000

[54] COMBINED CYCLE POWER PLANT HAVING IMPROVED COOLING AND METHOD OF OPERATION THEREOF

[75] Inventors: Jon P. Donovan, Orlando; Gerald A. Myers, Longwood; Michael T. McManus, Oviedo, all of Fla.

[73] Assignee: Siemens Westinghouse Power Corporation, Orlando, Fla.

[21] Appl. No.: 09/198,216

[22] Filed: Nov. 23, 1998

[51] Int. Cl.$^7$ .............................. F02C 13/10; F02C 6/18
[52] U.S. Cl. ...................... 60/39.02; 60/39.182; 60/39.75
[58] Field of Search .............................. 60/39.02, 39.182, 60/39.75

[56] References Cited

U.S. PATENT DOCUMENTS

| | | |
|---|---|---|
| 3,953,966 | 5/1976 | Martz et al. . |
| 4,932,204 | 6/1990 | Pavel et al. . |
| 4,989,405 | 2/1991 | Duffy et al. . |
| 5,109,665 | 5/1992 | Hoizumi et al. . |
| 5,251,432 | 10/1993 | Bruckner et al. . |
| 5,255,505 | 10/1993 | Cloyd et al. . |
| 5,357,746 | 10/1994 | Myers et al. . |
| 5,379,588 | 1/1995 | Tomlinson et al. . |
| 5,386,685 | 2/1995 | Frutschi . |
| 5,404,708 | 4/1995 | Sigling et al. . |
| 5,412,937 | 5/1995 | Tomlinson et al. . |
| 5,428,950 | 7/1995 | Tomlinson et al. . |
| 5,431,007 | 7/1995 | Viscovich et al. . |
| 5,491,971 | 2/1996 | Tomlinson et al. . |
| 5,577,377 | 11/1996 | Tomlinson . |
| 5,628,183 | 5/1997 | Rice . |
| 5,647,199 | 7/1997 | Smith . |
| 5,661,968 | 9/1997 | Gabriel . |
| 5,697,208 | 12/1997 | Glezer et al. . |
| 6,018,942 | 2/2000 | Liebig ............................... 60/39.182 X |

FOREIGN PATENT DOCUMENTS

| | | |
|---|---|---|
| 2277965 | 11/1994 | United Kingdom . |
| 2318833 | 5/1998 | United Kingdom . |

OTHER PUBLICATIONS

Jeffs, ABB Brings GT24 and Once–through Boiler to New England Merchant Plant, Turbomachinery International (Jan./Feb. 1998 Issue).

Notification of Transmittal of the International Search Report, Dated Jun. 16, 2000 –Intl. Appl. No. PCT/Us99/27843.

Patent Abstracts of Japan –Publication No. 08021207; Publication Date Jan. 23, 1996.

*Primary Examiner*—Timothy S. Thorpe
*Assistant Examiner*—Ehud Gartenberg
*Attorney, Agent, or Firm*—Eckert Seamans Cherin & Mellott, LLC

[57] ABSTRACT

An improved combined cycle power plant (10) having a plurality of kettle boilers (30,31,32) used in sequence for cooling the compressed air being directed via line (29) to cool portions of the gas turbine (20). The kettle boilers remove heat from the compressed air and produce a plurality of steam flows in lines (70,71,73) at pressures in parallel with the heat recovery steam generator (41,42,43) steam flows. Steam in line (72) for cooling other portions of the gas turbine is maintained at a very high level of purity by providing a high rate of blowdown through line (65) from the steam drum (45) providing the steam. Heat from the blowdown flow is directed to heat exchanger (66) to heat incoming fuel gas from source (26), or alternatively to heat the condensate via line (74) during periods of fuel oil operation.

23 Claims, 1 Drawing Sheet

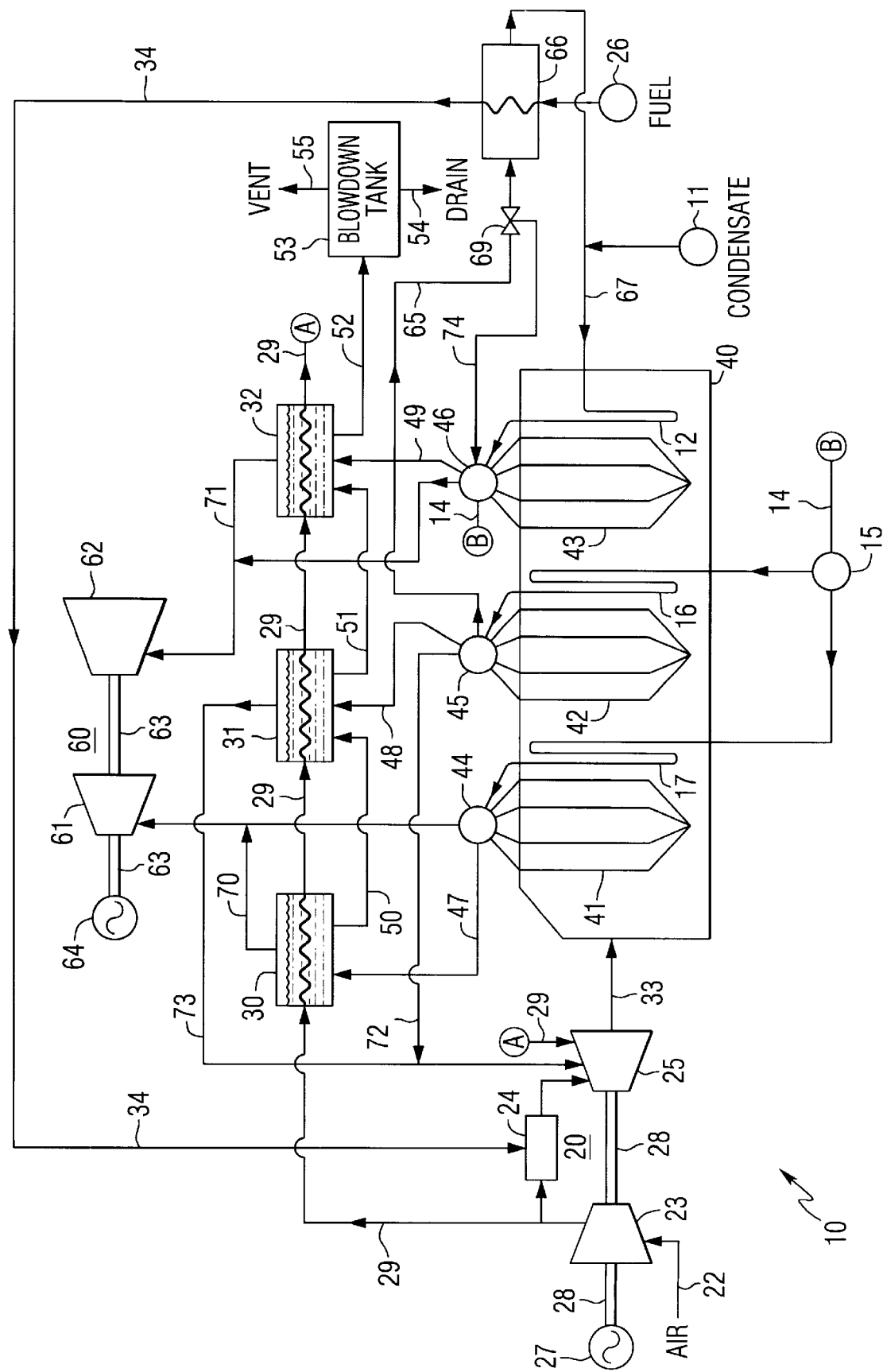

COMBINED CYCLE POWER PLANT HAVING IMPROVED COOLING AND METHOD OF OPERATION THEREOF

FIELD OF THE INVENTION

This invention relates to the field of combined cycle power plants having a combustion turbine system which produces electricity and exhaust gas, a heat recovery steam generator which uses the exhaust gas from the combustion turbine system to produce steam, and a steam turbine which uses the steam to produce electricity. The invention relates more particularly to an improved apparatus and method for cooling a combined cycle power plant. The invention relates in particular to an apparatus and method for providing both cooled compressed air and highly pure steam for cooling of an advanced combustion turbine system while simultaneously reducing the waste heat produced and improving the overall efficiency of the plant.

BACKGROUND OF THE INVENTION

Combined cycle power plants are known in the art as an efficient means for converting fossil fuels to thermal, mechanical and/or electrical energy. Such systems are described in U.S. Pat. No. 4,932,204 dated Jun. 12, 1990; U.S. Pat. No. 5,255,505 dated Oct. 26, 1993; U.S. Pat. No. 5,357,746 dated Oct. 25, 1994; U.S. Pat. No. 5,431,007 dated Jul. 11, 1995; and U.S. Pat. No. 5,697,208 dated Dec. 16, 1997; each of which is incorporated by reference herein.

It is known in the art to use air from the outlet of the compressor section of a gas turbine system to cool selected turbine parts, and further, it is known to cool the compressed air after it leaves the compressor and before reintroducing it into the turbine. Typical prior art methods for cooling this air are discussed in the above mentioned U.S. Pat. No. 5,697,208. These include using a fin/fan heat exchanger that would discharge the removed heat into the atmosphere as waste, or using this energy to pre-heat fuel for the gas turbine. As the compression ratios of compressors have increased, the temperature of the compressed air produced by the compressor has increased. At the same time, the cooling requirements for the hot turbine parts has increased due to increased firing temperatures. Most recently, it has become known in the art to cool this compressed air by passing it through a once-through cooler, and using the heat to generate high pressure steam. However, such prior art systems do not provide optimal levels of cooling for combined cycle power plants utilizing the most modern engine designs.

Due to high firing temperatures and the need to design higher efficiency combustion turbines, efficient methods for cooling hot components with the combustion turbine have been developed. One particular cooling scheme that has been developed passes steam through very small cooling passages in various parts of the turbine. These passages may be subject to blockage if the cooling steam is not maintained at a very high purity level. Furthermore, exotic alloys are being developed and used for these higher temperature applications. These materials may be subject to degradation if the cooling steam is not very pure. The source of cooling steam in prior art applications is often the intermediate pressure steam produced in the heat recovery steam generator. With a traditional blowdown scheme and for the pressure range in which the intermediate pressure evaporator may typically operate, the American Boiler Manufacturers Association (ABMA) recommends a maximum concentration of total dissolved solids (TDS) of about 2,500 ppm within the drum. The maximum fractional carryover recommended by the ABMA for this typical pressure is 0.0005. This corresponds to a steam TDS of about 1 ppm which is unacceptable for some new steam cooled combined cycle plant applications. Prior to this invention, the steam purity has been improved by improving the quality of the incoming feedwater to maintain the concentration of impurities in the drum to low levels. This is done by using condensate polishing systems. Such systems have proven to be expensive and unable to provide the desired steam quality.

There is also an ongoing need to reduce the boiler blowdown flow from combined cycle plants. Waste water is both difficult to dispose of and expensive to replace as makeup to the cycle. As such, it is advantageous to offer a power plant design which has the lowest level of boiler blowdown flow.

The market continues to demand increasing efficiency from combined cycle power plant designs. Modern advanced turbine systems have plant efficiency goals of 60% and more. To achieve such levels of performance, system designs must incorporate even higher compression ratios and higher combustion temperatures, as well as advanced cooling techniques with new exotic metals capable of withstanding such operating conditions. Furthermore, system designs which waste heat to the environment are no longer favored for both environmental and efficiency reasons.

SUMMARY

Accordingly, it is an object of this invention to provide a combined cycle power plant, and a method for operating the same, that has improved means for cooling of the combustion turbine system in order to provide improved thermal efficiency, reduced water and heat discharge to the environment, and higher quality cooling steam.

In order to achieve the above and other objects of the invention, a combined cycle power plant according to one aspect of this invention includes a combustion turbine system having a compressor for providing compressed air, a combustor for combusting a fuel in said compressed air to produce combustion air, and a gas turbine for expanding said combustion air to produce mechanical energy and exhaust gas; a steam generator having an inlet for receiving said exhaust air and a plurality of sections located sequentially in a flow path of said exhaust gas for removing heat from said exhaust gas to produce a first plurality of steam flows at a plurality of pressures; a steam turbine having a plurality of inlets for receiving said first plurality of steam flows; a cooling air flow path for directing a portion of said compressed air to said gas turbine for cooling of a portion thereof; wherein said cooling air flow path further comprises a plurality of boilers arranged in sequence for receiving said portion of said compressed air and for removing heat from said portion of said compressed air to produce a second plurality of steam flows. A combined cycle power plant according to another aspect of this invention may also have a means for providing cooling steam from a first of said sections to said combustion turbine system; and a means for providing a blowdown flow from said first of said sections to a second of said sections. According to another aspect of this invention, the plant may also have a heat exchanger operable to transfer heat from said blowdown flow to said fuel, and further a means for bypassing said blowdown flow around said heat exchanger when said fuel is a fuel other than fuel gas.

BRIEF DESCRIPTION OF THE DRAWINGS

FIG. 1 is a schematic diagram of a combined cycle power plant according to the current invention.

DESCRIPTION OF THE PREFERRED EMBODIMENTS

Referring to FIG. 1, there is shown a combined cycle power plant 10 having a combustion turbine system 20, a heat recovery steam generator 40, and a steam turbine system 60.

Combustion turbine system 20 is shown to have an air inlet 22, a compressor 23, a combustor 24, and a gas turbine 25. During operation, the compressor 23 receives ambient air from the air inlet 22 and delivers compressed air to the combustor 23 where it is combined with fuel supplied from a fuel source 26 via line 34 to form hot combustion air. The hot combustion air is then expanded in the gas turbine 25 to provide mechanical energy to an electrical generator 27 via shaft 28 and an exhaust gas.

Exhaust gas from the gas turbine 25 is directed via duct 33 to the heat recovery steam generator 40. Within the heat recovery steam generator 40, the exhaust gas comes in sequential contact with a plurality of steam generator sections such as high pressure (HP) steam generator section 41, intermediate pressure (IP) steam generator section 42, and low pressure (LP) steam generator section 43. Each steam generator section includes a drum 44,45,46 at its upper end where the steam/water interface is maintained. Feedwater is provided to the LP steam generator section 43 from a condensate supply 11 through an LP economizer 12. Feedwater is provided to the IP steam generator section 42 and the HP steam generator section 41 from the drum 46 of the LP steam generator section via line 14 by a boiler feed pump 15. These feedwater supplies are directed through an IP economizer 16 and an HP economizer 17 respectively. The steam generator sections remove heat from the flow of exhaust gas and produce a plurality of steam flows at a plurality of pressures; such as for example, 1800 psia (124.0 Bar) at the HP steam generator outlet, 460 psia (31.7 Bar) at the IP steam generator outlet, and 50 psia (3.4 Bar) at the LP steam generator outlet.

A portion of the compressed air from the compressor 23 is directed via line 29 to the turbine 20 for use in cooling selected portions of the gas turbine 25, such as the turbine stationary vanes or rotating shaft and/or blades (not shown). In accordance with the current invention, the hot compressed air is directed via line 29 sequentially through a plurality of kettle boilers, such as high pressure boiler 30, intermediate pressure boiler 31, and low pressure boiler 32 to produce cooled compressed air which is then directed to the turbine 25. These boilers may be tube and shell type heat exchangers having the compressed air on the tube side and water/steam on the shell side, and they may be located external to the heat recovery steam generator as shown in FIG. 1, or may be constructed as part of the heat recovery steam generator 40. The operating pressures of the HP, IP and LP kettle boilers 30,31,32 correspond to the steam pressures of the HP, IP and LP steam generator sections 41,42,43 respectively of the heat recovery steam generator 40. Feedwater for the kettle boilers 30,31,32 is drawn from either the corresponding steam generator section 41,42,43 via lines 47,48,49, or from the boiler feed pump discharge (not shown). The boilers 30,31,32 serve to transfer heat from the hot compressed air within the tubes to the shell side feedwater, thereby cooling the compressed air and producing a plurality of steam flows at a plurality of pressures in parallel with the HP steam generator section 41, IP steam generator section 42 and LP steam generator section 43, respectively. Steam that is produced by the boilers 30,31,32 is directed to the corresponding HP, IP or LP drum 44,45,46, or as shown in FIG. 1 is joined with the steam flow from the steam generator sections 41,42,43 via lines 70,71,73. Recovering heat energy from the hot compressed air by producing steam in a plurality of boilers 30,31,32 operating at a plurality of pressure levels in parallel with the heat recovery steam generator sections 41,42,43 is a very efficient means of providing sufficiently cooled air for cooling of the gas turbine 25 while at the same time improving the overall cycle performance.

The plurality of kettle boilers 30,31,32 also provides a means for reducing the total system blowdown from a combined cycle power plant 10. As discussed above, lines 47, 48, 49 provide feedwater to the boilers 30,31,32 from the respective steam generator drums 44,45,46. Solids accumulating in the drums 44,45,46 as a result of the process of evaporation are removed via lines 47,48,49 to the respective boiler. A blowdown flow is provided via line 50 from the high pressure boiler 30 to the intermediate pressure boiler 31. Similarly, a blowdown flow is provided via line 51 from the intermediate pressure boiler 31 to the low pressure boiler 32. A system blowdown flow is provided via line 52 from the low pressure boiler 32 to a blowdown tank 53. The blowdown tank 53 is drained via line 54 vented via line 55. Blowdown flow through line 52 is the entire system blowdown. Because of the natural concentration of solids and other non-volatile contaminants which occurs in each of the boilers, there is a sequential concentration of the system blowdown flow as it passes from the high pressure boiler 30, through the intermediate pressure boiler 31, to the low pressure boiler 32. By taking the entire system blowdown flow from the low pressure boiler 32, the contaminants from each of the steam generator drums 44,45,46 and each of the boilers 30,31,32 is concentrated in a single system blowdown flow. By taking advantage of the concentration action of a plurality of kettle boilers, the current invention provides a means for reducing the overall system blowdown flow, thereby minimizing the amount of water and heat which is passed to the environment through the blowdown tank 53. By example, a prior art plant which may produce a typical system blowdown flow of 6,500 lbs/hr (0.82 kg/sec) could be designed in accordance with this invention to have a total system blowdown flow in the range of only 500–550 lb/hr (0.063–0.069 kg/sec).

As is known from the prior art, steam from the high pressure steam generator section 41 and the low pressure steam generator section 43 are directed to a high pressure steam turbine 61 and a low pressure steam turbine 62 respectively. In accordance with the current invention, steam from the high pressure kettle boiler 30 is provided via line 70 and from the low pressure kettle boiler 32 via line 71 to be combined with these steam flows and also directed to the high pressure and low pressure steam turbines 61,62 respectively. These turbines expand their respective steam flows to develop mechanical energy to turn shaft 63, thereby driving electrical generator 64.

As is known from the prior art, steam may be drawn from either the high pressure steam generator section 41 (in the form of cold reheat steam) or, as shown in FIG. 1, the intermediate pressure steam generator section 42, and may be directed via line 72 to cool parts of the gas turbine system 20, such as the combustor transition piece or turbine blades and vanes (not shown). In accordance with the current invention, steam from the intermediate pressure kettle boiler 31 is provided via line 73 and is combined with the steam from the intermediate pressure steam generator section 42 to cool parts of gas turbine 25. To maintain the desired level of quality in this cooling steam, the dissolved solids of the steam must be maintained to a predetermined level which satisfies the design requirements for the particular plant. An advanced combustion turbine system design may, for example, limit the sodium in the cooling steam to no more than 0.1 ppb or even 0.01 ppb, which is two orders of magnitude change from the typical prior art allowable range of 1–10 ppb of sodium. To achieve this level of steam quality, the present invention controls the steam quality by providing a connection for blowdown of the intermediate pressure steam generator section 42 (or high pressure steam generator section if that is the source of the cooling steam) at a high rate of flow. Such a connection for a high rate of blowdown flow is shown in FIG. 1 as line 65, and it may be sized to provide a blowdown flow rate which is in the range of 30–40%, or advantageously at least 33%, of the feedwater flow rate to that steam generator section. The use of such a high rate of blowdown flow will result in a reduction of dissolved solids in the IP drum 45 and will achieve the desired levels of dissolved solids in the steam, such as limiting the dissolved sodium to no more than 0.1 ppb or even 0.01 ppb.

Prior art combined cycle plants typically utilized a phosphate chemistry to control the pH in the HP and IP steam generator drums 44,45. Prior art plants typically utilized an all-volatile treatment (AVT) in the LP steam generator drum 46, since the high rate of outflow from that drum used to feed the HP and IP steam generator sections 44,45 made the control of phosphates impractical. A combined cycle plant built in accordance with this invention will use AVT chemistry control in both the LP steam generator drum 46 and the drum from which the cooling steam is drawn (the IP drum 45 as shown in FIG. 1) since the high rate of blowdown flow will make phosphate chemistry control impractical.

The high rate of blowdown flow may be directed by line 65 to a fuel gas heat exchanger 66, where heat energy is transferred from the blowdown flow to an incoming flow of fuel from fuel source 26 which may be supplying fuel gas, thereby pre-heating the fuel gas. The temperature of the blowdown flow from the intermediate pressure steam generator section 42 may typically be in the range of 450–475 degrees F. (232–246 degrees C.), which when used in a typical fuel gas heat exchanger 66 will achieve a fuel gas temperature of approximately 400 degrees F. (204 degrees C.). If the HP steam generator section 41 is used as the source for the cooling steam, the blowdown flow may be in the range of 630–640 degrees F. (332–338 degrees C.), thereby permitting the fuel gas to be heated to a temperature of approximately 600 degrees F. (316 degrees C.) These elevated fuel temperatures result in improved combustion efficiencies, and the use of this heat to raise the temperature of the fuel gas prevents it from being wasted to the environment.

The blowdown flow leaving the fuel gas heat exchanger 66 is recirculated to the LP economizer 12 inlet of the heat recovery steam generator 40 via line 67. For typical combined cycle plant operation, the temperature of the water from the condensate supply 11 may be approximately 100 degrees F. (38 degrees C.). To maintain the tubes in the heat recovery steam generator 40 above the carbonic acid dew point, it is necessary to maintain the condensate at a temperature of between 120–140 degrees F. (49–60 degrees C.). By recirculating blowdown via line 67 to the condensate inlet in accordance with this invention, the need for additional condensate pre-heating is minimized.

It is also known to provide a combined cycle power plant with the capability of operating on fuel gas and on a fuel other than fuel gas, such as fuel oil. During operation of the combined cycle plant 10 on oil fuel, sulfuric acid condensation on the cold end tubes of the heat recovery steam generator 40 becomes a problem due to the higher concentration of sulfur in fuel oil than in fuel gas. For oil operation, the last stage of the heat recovery steam generator is typically bypassed and the low pressure drum 46 is used as a direct contact heat exchanger. Because the duty required to heat the condensate to a temperature above the sulfuric acid dew point is typically greater than what the low pressure circuit can support, intermediate pressure steam is often used in the prior art to "peg" the low pressure drum 46 pressure, in other words, to add heat to the low pressure circuit. For a plant built in accordance with the current invention, this pegging steam requirement can be eliminated by providing a means for bypassing the fuel gas heat exchanger 66 during oil fuel operation. In FIG. 1 such a means for bypassing the fuel gas heat exchanger 66 is shown as valve 69 and line 74. During oil operation, the fuel gas heat exchanger 66 is bypassed but blowdown water is still drawn from the intermediate pressure drum 45 at a flow rate which is the same as, or is close to, that drawn during fuel gas operation. The hot blowdown water recirculates to the LP system either via the condensate piping or, as shown in FIG. 1, directly to the LP drum 46 via line 74, thereby pre-heating the feedwater which enters the low pressure drum 46, and in doing so acts as the supplemental heat source to the low pressure circuit. Also, by drawing similar flow rates of blowdown for both modes of fuel operation, stability is maintained in the IP economizer section 16 which otherwise might experience steaming were the flow rate reduced.

Other aspects, objects and advantages of this invention may be obtained by studying the FIGURE, the disclosure, and the appended claims.

We claim as our invention:

1. A combined cycle power plant comprising:

a combustion turbine system having a compressor for providing compressed air, a combustor for combusting a fuel in said compressed air to produce combustion air, and a gas turbine for expanding said combustion air to produce mechanical energy and exhaust gas;

a steam generator having an inlet for receiving said exhaust air and a plurality of sections located sequentially in a flow path of said exhaust gas for removing heat from said exhaust gas to produce a first plurality of steam flows at a plurality of pressures;

a steam turbine having a plurality of inlets for receiving said first plurality of steam flows;

a cooling air flow path for directing a portion of said compressed air to said gas turbine for cooling of a portion thereof;

wherein said cooling air flow path further comprises a plurality of boilers arranged in sequence for receiving said portion of said compressed air and for removing heat from said portion of said compressed air to produce a second plurality of steam flows.

2. The combined cycle power plant of claim 1, wherein said plurality of sections comprises a first section and a second section, said first producing a steam flow at a pressure higher than that of said second section, and wherein said plurality of boilers comprises a first boiler and a second boiler, said first boiler producing a steam flow at a pressure higher than that of said second boiler, said combined cycle power plant further comprising:

a means for providing water from said first section to said first boiler;

a means for providing water from said second section to said second boiler;

a means for providing a first blowdown flow from said first boiler to said second boiler;

a means for providing a second blowdown flow from said second boiler to a blowdown tank.

3. The combined cycle power plant of claim 1, wherein said plurality of sections comprises a first section, a second section, and a third section, said first section producing a steam flow at a pressure higher than that of said second section, and said second section producing a steam flow at a pressure higher than that of said third section, wherein said plurality of boilers comprises a first boiler, a second boiler, and a third boiler, said first boiler producing a steam flow at a pressure higher than that of said second boiler, and said second boiler producing a steam flow at a pressure higher than that of said third boiler, said combined cycle power plant further comprising:

a first blowdown line connecting said first boiler and said second boiler;

a second blowdown line connecting said second boiler and said third boiler;

a third blowdown line connecting said third boiler to a blowdown tank.

4. The combined cycle power plant of claim 3, further comprising:

a means for supplying feedwater to said first boiler from said first section;

a means for supplying feedwater to said second boiler from said second section;

a means for supplying feedwater to said third boiler from said third section.

5. The combined cycle power plant of claim 1, further comprising:

a means for providing cooling steam from a first of said sections to said combustion turbine system;

a means for providing a blowdown flow from said first of said sections to a second of said sections.

6. The combined cycle power plant of claim 5, wherein said means for providing a blowdown flow further comprises a heat exchanger operable to transfer heat from said blowdown flow to said fuel.

7. The combined cycle power plant of claim 6, further comprising a means for bypassing said blowdown flow around said heat exchanger when said fuel is a fuel other than fuel gas.

8. A combined cycle power plant comprising:

a combustion turbine operable to burn a fuel to produce mechanical energy and hot exhaust gas;

a heat recovery steam generator having a plurality of sections and operable to receive said hot exhaust gas and to produce steam at a plurality of pressures;

a steam turbine operable to receive said steam and to produce mechanical energy;

a means for directing a portion of said steam produced in a first of said sections to said combustion turbine to cool a portion thereof;

a means for recirculating a blowdown flow from said first of said plurality of sections to a second of said sections.

9. The combined cycle power plant of claim 8, wherein the rate of said blowdown flow is sufficient to maintain the concentration of dissolved sodium in said portion of said steam to no more than 0.1 ppb.

10. The combined cycle power plant of claim 8, wherein the rate of said blowdown flow is sufficient to maintain the concentration of dissolved sodium in said portion of said steam to no more than 0.01 ppb.

11. The combined cycle power plant of claim 8, wherein said means for recirculating further comprises a heat exchanger operable to transfer heat from said blowdown flow to said fuel.

12. The combined cycle power plant of claim 11, further comprising a means for directing said blowdown flow through said heat exchanger when said fuel comprises fuel gas, and a means for bypassing said blowdown flow around said heat exchanger when said fuel comprises a fuel other than fuel gas.

13. A method of operating a combined cycle power plant having a combustion turbine system, a heat recovery steam generator, and a steam turbine system, the method comprising the steps of:

providing said heat recovery steam generator with a plurality of sections;

providing a plurality of boilers;

operating said combustion turbine system to burn a fuel to produce hot compressed air, mechanical energy, and a flow of exhaust gas;

directing said flow of exhaust gas through said heat recovery steam generator to produce from said plurality of sections a first plurality of steam flows at a plurality of pressures;

directing a portion of said hot compressed air through said plurality of boilers to produce a flow of cooled compressed air and a second plurality of steam flows;

directing said flow of cooled compressed air to cool a portion of said combustion turbine system.

14. The method of claim 13, further comprising the steps of:

providing a first blowdown flow from a first of said boilers to a second of said boilers;

providing a second blowdown flow from a second of said boilers to a blowdown tank.

15. The method of claim 14, further comprising the steps of:

providing feedwater for said first boiler from a first of said sections; and providing feedwater for said second boiler from a second of said sections.

16. The method of claim 13, wherein said plurality of sections comprises a high pressure section, an intermediate pressure section, and a low pressure section, and wherein said plurality of boilers comprises a high pressure boiler, an intermediate pressure boiler, and a low pressure boiler, the method further comprising the steps of:

providing feedwater for said high pressure boiler from said high pressure section;

providing feedwater for said intermediate pressure boiler from said intermediate pressure section;

providing feedwater for said low pressure boiler from said low pressure section;

providing a first blowdown flow from said high pressure boiler to said intermediate pressure boiler;

providing a second blowdown flow from said intermediate pressure boiler to said low pressure boiler;

providing a third blowdown flow from said low pressure boiler.

17. The method of claim 13, wherein said first plurality of steam flows comprises a first steam flow from a first of said plurality of sections, and further comprising the steps of:

directing said first steam flow to said combustion turbine system to cool a portion thereof;

providing a blowdown flow from said first of said plurality of sections at a rate sufficient to maintain said first steam flow at a predetermined level of quality;

recirculating said blowdown flow to a second of said plurality of sections.

18. The method of claim 17, further comprising the steps of:

providing a heat exchanger operable to transfer heat from said blowdown flow to said fuel.

19. The method of claim 17, further comprising the steps of:

providing a heat exchanger operable to transfer heat from said blowdown flow to said fuel;

and wherein said step of recirculating further comprises the steps of:

directing said blowdown flow through said heat exchanger when said combustion turbine system is being operated on a fuel gas; and bypassing said blowdown flow around said heat exchanger when said combustion turbine system is being operated on a fuel oil.

20. A method of operating a combined cycle power plant having a combustion turbine system, a heat recovery steam generator and a steam turbine system, the method comprising the steps of:

operating said combustion turbine system to burn a fuel to generate mechanical energy and a flow of exhaust gas;

directing said flow of exhaust gas to said heat recovery steam generator;

providing a plurality of sections as part of said heat recovery steam generator, said sections being operable to remove heat from said flow of exhaust gas to produce a plurality of steam flows at a plurality of pressures;

providing a means for directing a portion of a first of said plurality of steam flows from a first of said plurality of sections to said combustion turbine system for cooling parts thereof;

maintaining a blowdown flow from said first of said plurality of sections at a rate sufficient to maintain a quality of said first of said plurality of steam flows to a predetermined level;

recirculating said blowdown flow to a second of said plurality of sections.

21. The method of claim 20, further comprising the steps of:

providing a heat exchanger operable to transfer heat from said blowdown flow to said fuel.

22. The method of claim 20, further comprising the steps of:

providing a heat exchanger operable to transfer heat from said blowdown flow to said fuel;

and wherein the step of recirculating further comprises the steps of:

directing said blowdown flow through said heat exchanger when said fuel comprises fuel gas; and bypassing said blowdown flow around said heat exchanger when said fuel comprises fuel oil.

23. The method of claim 20, further comprising the step of controlling said rate of blowdown flow to limit the concentration of sodium in said portion of a first of said plurality of steam flows to no more than 0.1 ppb.

* * * * *